United States Patent
Dewberry

[15] 3,670,771
[45] June 20, 1972

[54] FLUID OPERATED BOOSTER VALVE

[72] Inventor: Albert W. Dewberry, Littleton, Colo.

[73] Assignee: C. A. Norgren Co., Littleton, Colo.

[22] Filed: Dec. 11, 1969

[21] Appl. No.: 3,311

Related U.S. Application Data

[63] Continuation of Ser. No. 641,927, May 29, 1967, abandoned.

[52] U.S. Cl............................137/625.6, 251/28, 251/61.3
[51] Int. Cl.......................................................F16k 31/385
[58] Field of Search..............137/329.3, 625.6, 625.66; 251/28, 41, 29, 43, 61.3

[56] References Cited

UNITED STATES PATENTS

| | | | |
|---|---|---|---|
| 2,191,162 | 2/1940 | Schnell | 251/28 X |
| 2,935,972 | 5/1960 | Hard Af Segerstad | 251/43 X |
| 1,625,044 | 4/1927 | McKeown | 137/329.3 X |
| 2,573,369 | 10/1951 | Snoddy | 251/46 X |
| 2,722,234 | 11/1955 | Macgeorge et al. | 137/625.6 |
| 2,912,009 | 11/1959 | Cooksley | 137/625.65 |
| 2,913,005 | 11/1959 | Grant et al. | 137/625.6 |
| 3,326,239 | 6/1967 | Saint-Joanis et al. | 137/625.66 |
| 3,470,910 | 10/1969 | Loveless | 137/625.6 |

*Primary Examiner*—M. Cary Nelson
*Assistant Examiner*—Robert J. Miller
*Attorney*—Sheridan and Ross and Victor C. Muller

[57] ABSTRACT

Valve housing with high pressure inlet from line and high pressure outlet to load. Housing has coaxial bores with poppet or spool valve in small bore to control high pressure flow. Valve connected by stem to piston in large bore and valve is normally urged to closed position with fluid leakage through piston exiting through bleed hole. Closure for bleed hole operated by low pressure piston or diaphragm (1 psi or less) to build up pressure on free end of piston and move it to open valve.

6 Claims, 4 Drawing Figures

INVENTOR
ALBERT W. DEWBERRY

BY Sheridan and Ross
ATTORNEYS

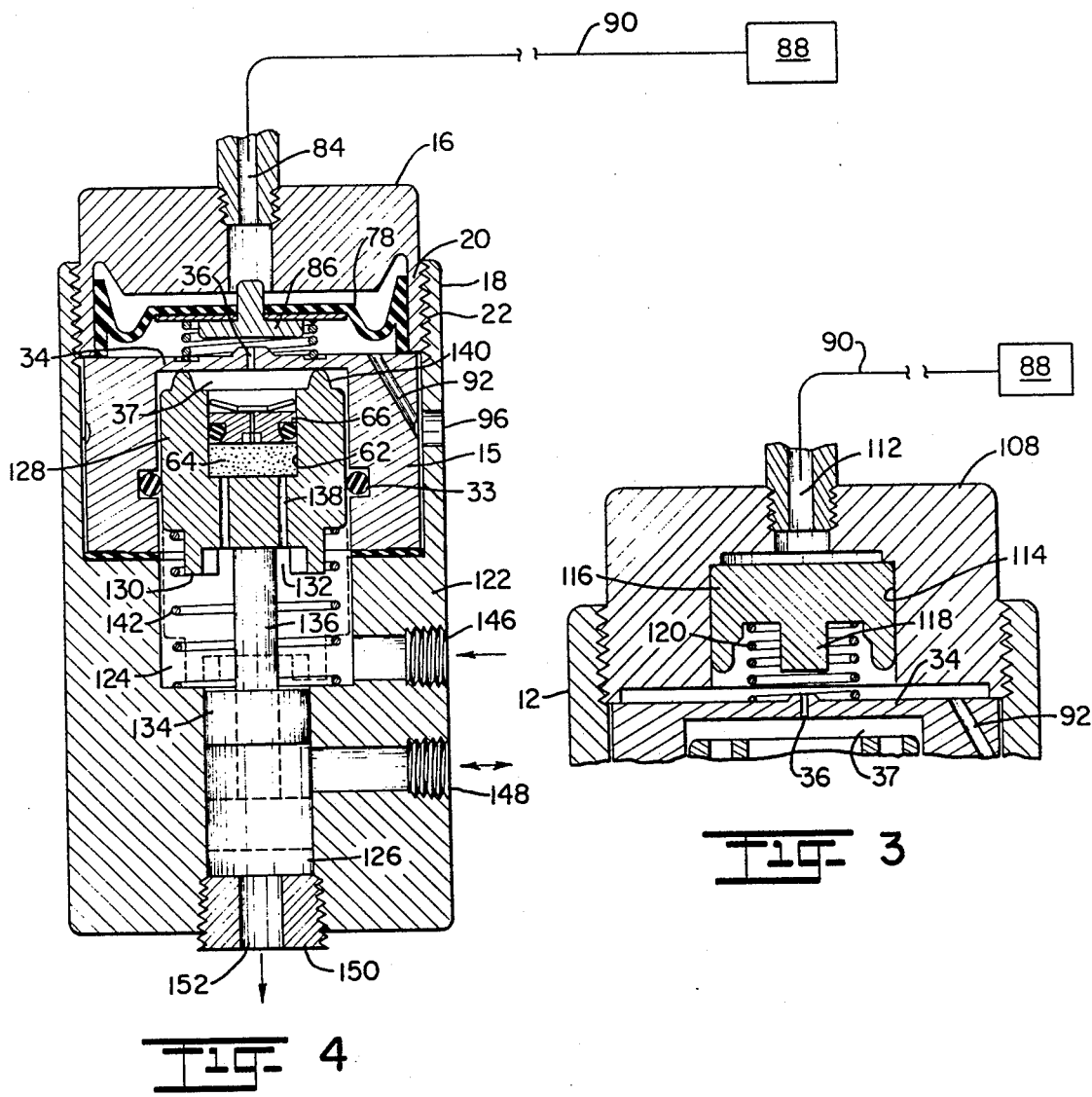

FLUID OPERATED BOOSTER VALVE

This application is a continuation of application, Ser. No. 641,927, filed May 29, 1967 and now abandoned.

BACKGROUND OF THE INVENTION

This invention lies in the field of valves for controlling the flow of high pressure fluid, usually compressed air although not so limited, from a source to a load such as a fluid actuated tool or servo motor. It is directed more particularly to such a valve which may be actuated remotely by a signal from a fluidics control system.

The science of fluidics has been progressing rapidly in recent years and it is now possible to construct rather complex circuits which operate in the same general way as comparable electronic circuits, using very small fluid signal impulses to vary the flow through the circuitry. The ultimate purpose of such circuitry is ordinarily to apply desired control signals to external devices.

One of the great advantages of fluidics circuitry is that very little energy is involved and the power requirements are minimal. However, as a result, the end signal produced is also very small and usually it must be greatly amplified to perform the desired function. Where electrical or electronic devices are to be controlled, the signal may be ample to operate a "-Micro Switch" or other typical snap switch. Such a switch can, of course, operate an electrical relay which provides as much power as desired. The relay can in turn operate mechanical switches or valves to control large amounts of electrical or fluid power. However, the need remains for a device which can take a fluidics signal of one psi or less and directly actuate a mechanical valve for controlling high fluid pressures which may greatly exceed 100 psi.

SUMMARY OF THE INVENTION

The present invention solves the problem in a direct and simple manner. Generally stated, the device comprises a housing having two concentric bores extending longitudinally and in flow communication with each other. The bores are of different diameter to form a relatively larger chamber at a first end and a relatively smaller chamber at the second end. A piston travels longitudinally in the first bore and is fixedly connected by a stem to a valve member which travels longitudinally in the second bore. A high pressure fluid inlet port communicates with the smaller chamber and a high pressure fluid outlet port is adapted to communicate with the larger chamber. The valve member opens and closes direct fluid communication between the ports in response to piston movements.

An end wall on the housing closes the end of the first bore and defines with it and the piston a variable volume chamber, and the end wall is provided with a bleed hole to allow fluid to escape. The valve member is normally urged by spring means to closed position and high pressure fluid applied to the smaller chamber is provided with a restricted leakage path, preferably through the piston to allow some fluid to reach the variable volume chamber, but no back pressure is developed because the flow rate of the bleed hole is considerably greater than that of the leakage path.

When the piston is in its forward position, adjacent to the end wall, the valve member is in closing position and no high pressure fluid flows from the source to the load or machine to be operated. A closure is provided for the bleed valve and may be carried by a diaphragm or a piston mounted to a cap which is attached to the first end of the housing. The cap is provided with an inlet port which is adapted to receive a low pressure signal from a fluidics system. Since the bleed hole is actually very small, of the order of 0.025 inch in diameter or less, the fluidics system pressure is adequate to force the closure into sealing engagement.

When the bleed hole is sealed, pressure builds up in the variable volume chamber and forces the piston rearwardly to open the valve member. The effective area of the involved face of the piston is greater than that of the valve member and thus the area differential insures positive and rapid movement. A second valve means is provided to cut off any fluid pressure on the piston when the valve member is open. Upon cessation of the low pressure signal, the closure is unseated and the bleed hole exhausts the variable volume chamber, whereupon the piston again approaches the end wall and the valve member closes communication between the high pressure inlet and outlet ports. An exhaust port in the housing is included which communicates through the second valve when the valve member is closed. With this self-powering arrangement, a line pressure of 150 psi can be readily controlled by a signal pressure equivalent to a head of only 2 inches of water. This is a ratio of about 2000:1.

BRIEF DESCRIPTION OF THE DRAWINGS

Various other advantages and features of novelty will become apparent as the description proceeds in conjunction with the accompanying drawings, in which:

FIG. 3 is a view similar to FIG. 1, showing a modified form of closure operator; and FIG. 4 is a view similar to FIG. 1, showing a modified form of valve member.

DESCRIPTION OF THE PREFERRED EMBODIMENTS

Figures 1, 2:
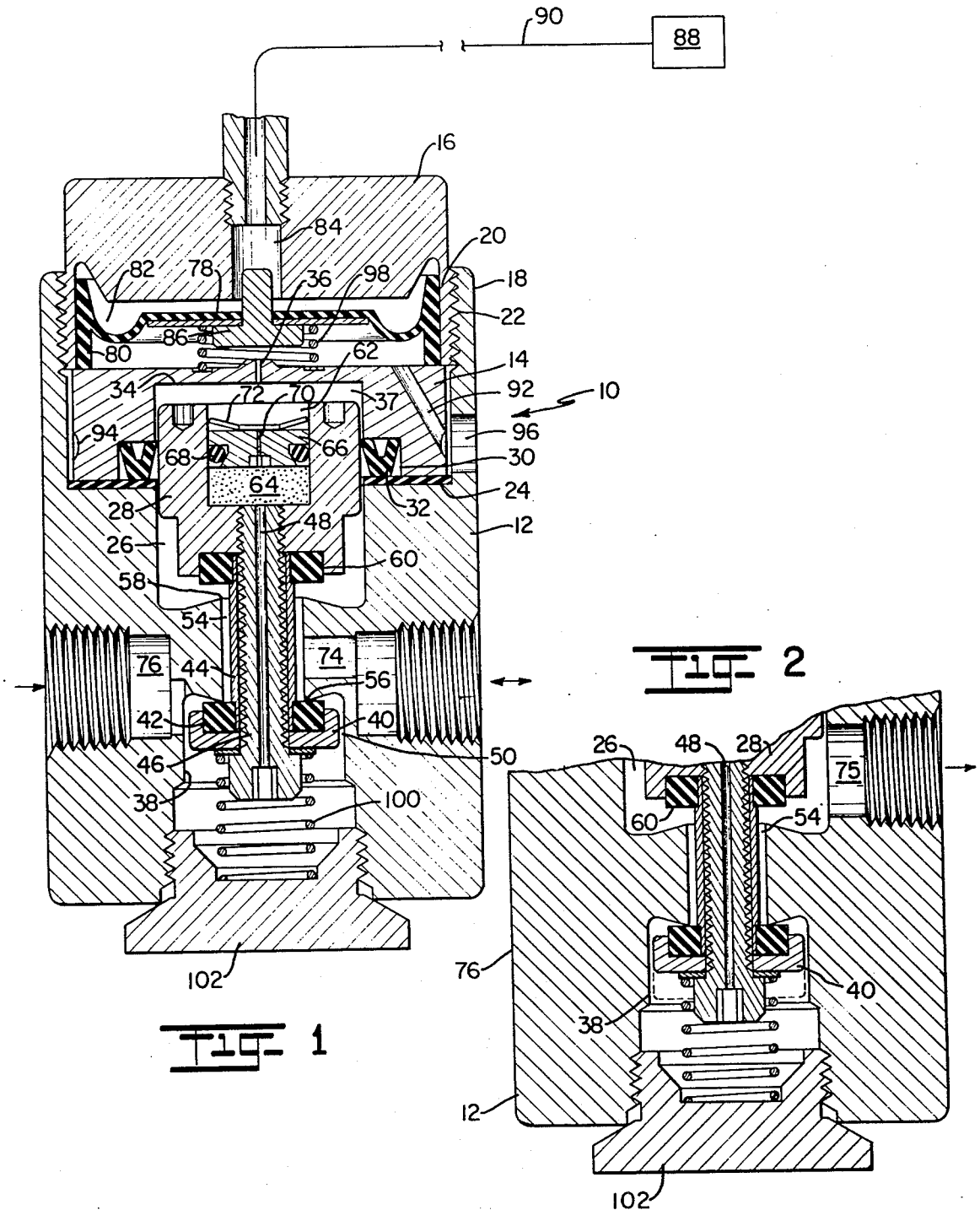
FIG. 1 is a partly schematic sectional view of a booster valve incorporating the principal features of the invention.
FIG. 2 is a sectional view of a portion of the valve of FIG. 1 showing the exhaust port thereof.

The invention in one form is illustrated in FIG. 1, in which the housing 10 includes a main body section 12, an end member 14 and a cap 16. The body section 12 is preferably though not necessarily cylindrical, and is provided with an annular recess defined by cylindrical extension 18 to receive the end member and cap. The latter has a threaded sleeve extension 20 cooperating with thread 22 in extension 18 to clamp member 14 in place on gasket 24 as shown.

Members 12 and 14 are bored out to exactly the same size to define a single first bore 26 to slidingly receive piston 28. A counterbore 30 is formed in member 14 to receive a Chevron type seal 32 mounted with its wider or open end facing the first end of the housing and the end wall 34. The latter is provided with a centrally located bleed hole 36 to exhaust the variable volume chamber 37 defined by the outer end of bore 26, the piston, and the end wall.

A second smaller bore 38 is formed in the second end of the housing and receives valve member 40 for longitudinal movement. In this form member 40 is a poppet valve and is provided with a disk seal 42. Member 40 is fixedly connected to piston 28 by a stem consisting of a sleeve 44 and a bolt 46. The bolt is centrally bored at 48 to provide flow communication with bore 38.

A third bore 54 is smaller than the other bores and coaxial with them to provide flow communication between them and around the stem 44, 46. Its rearward end, facing valve member 40, is formed with a valve seat 56 to be engaged by disk seal 42 on occasion, and its forward end, facing the piston, is formed with a valve seat 58 to be engaged by the disk seal 60, carried by the piston, on occasion.

Piston 28 at its outer end or face is provided with a counterbore 62 in which is received a filter disk 64 and a plug 66, sealed by an O-ring 68 and having a central bleed aperture 70 smaller than bleed hole 36. The plug and filter are held in place by a centrally apertured star ring 72. This completes the assembly which provides a restricted leakage path from bore 38 to variable volume chamber 37 by way of 58, 64, and 70. The filter is closely packed and functions to remove any particles from the flow stream that might otherwise block the bleed holes 36 and 70.

A high pressure outlet port is provided at 74, in communication with central third bore 54 and consequently with bore 26 behind piston 28. A high pressure inlet port is provided at 76 in communication with bore 38 by means of the annular space 50 shown in FIG. 1 between valve member 40 and the wall of bore 38. In the position shown in FIG. 1, valve member 40 through the engagement of seal 42 and seat 56 blocks or closes communication between the inlet and outlet ports through bore 54 but when it moves rearwardly it opens communication so that high pressure fluid may pass from the source to the load to be actuated.

Cap 16 carries a flexible diaphragm 78 provided with a lip seal 80 sealingly engaging the inner wall of extension 20 to provide an airtight expansible chamber 82 communicating with the low pressure inlet port 84. The diaphragm carries a closure 86 adapted to seal bleed hole 36 when chamber 82 expands. Fluid at low pressure is supplied to the inlet port 84 on occasion from fluidics system 88 by conduit 90. Bleed hole 36 has an adequate exhaust path to atmosphere by way of passage 92 and annular groove 94 in member 14, and aperture 96 in member 12, thus avoiding any possibility of undesired backpressure.

Compression spring 98 urges diaphragm 78 to its retracted position when there is no signal pressure. Compression spring 100, backed by cap 102, applies pressure to normally urge valve member to closed position and in turn maintain the piston toward the first end of the housing.

Thus in the position shown, the valve member is in closing position and the piston is adjacent to end wall 34. High pressure fluid enters port 76 and bore 38 behind poppet valve 40 thus further urging the latter and piston 28 toward the end wall 34. A small amount of fluid flows along the leakage path previously described and into chamber 37. However, no pressure is built up because the fluid is promptly exhausted through bleed hole 36 which as stated is larger than hole 70. Thus valve 40 remains closed and there is no flow through outlet port 74 to the load.

When system 88 sends a signal, low pressure builds up in chamber 82 against the large area of the diaphragm, and closure 86 is moved into sealing engagement with bleed hole 36. Pressure now builds up in chamber 37 and forces the piston rearwardly, opening valve 40 and actuating the load. The total pressure in chamber 37 is adequate to accomplish this because the involved effective area of the piston is larger than that of the lower poppet 40. When the valve is wide open communication between 76 and 74 is through third bore 54 and seal 60 contacts valve seat 58 and cuts off any pressure on the rear face of the control piston 28.

The Chevron seal 32 is arranged as shown to assist the return of the piston toward the end wall, and in actuality is a one way seal. Its open end is toward the end wall and very little friction pressure is exerted against the wall of the piston. The seal is still adequate for this operation because there is no back pressure at the time from chamber 37 which is vented to atmosphere.

Referring to FIG. 2 an exhaust port 75 is provided and thus the booster valve is really a three way valve to supply fluid to port 74 or vent the latter. For example, the exhaust port functions upon deactuation of the poppet valve 40 and the opening of seal 60 to permit venting, where such is required, from the fluid path 74 – 54 – 26 – 75.

The modification of FIG. 3 is the same as that of FIG. 1 except for the expansible chamber closure actuator. In this figure, the cap 108 has a threaded portion engaged with extension 18 of body member 12. The cap has a low pressure inlet port 112 leading to counterbore 114 serving as a cylinder for piston 116. The piston has a sealing, sliding fit in the cylinder and is provided with a central boss 118 which serves as the closure for bleed hole 36. Spring 120 urges the piston and closure away from the bleed hole when the signal pressure is removed.

A modification incorporating a plug or spool type valve member is illustrated in FIG. 4 where the main body section 122 of the housing is formed with only two bores 124 and 126. Piston 128 is similar to piston 28 but adapted to move in end member 15 against an O-ring seal 33 and is provided with a pair of depending arcuate skirts or bosses 130 providing flow passages 132 between them. A plug or spool type valve member 134 is fixedly connected to the piston by stem 136 and has a sealing, sliding fit in bore 126. The piston has offset leakage flow passages 138 and end bosses 140 to maintain clearance in the variable volume chamber 37. Spring 142 is provided to urge the piston toward end wall 34.

A high pressure inlet port 146 leads to bore 124 and communicates with bore 126 and high pressure outlet port 148 leads directly to bore 126. In the position shown, the piston is at its extreme position adjacent to the end wall, and valve member 134 is in its closing position, blocking communication between the inlet and outlet ports. When bleed hole 36 is sealed by closure 86, the piston and valve member are forced rearwardly to the dotted line positions and a free flow path is established between the inlet and outlet ports.

A plug 150 at the rear of bore 126 is provided with an exhaust port 152, which communicates with outlet port 148 when the valve member is in closing position. Basically, the valve of FIG. 4 operates in the same manner as that of FIG. 1 and may be used for the same purposes.

It will be seen that a valve assembly has been provided which enables the flow control of very high pressure fluids by a signal at an extremely low pressure without the intervention of complicated power boosters, allowing pressure ratios of as much as 2000:1. In effect the valve actuator is self boosted, using the same line pressure which it is controlling.

I claim:

1. In a fluid operated booster valve of the type having a housing, a high pressure inlet supply port, a high pressure outlet delivery port, and exhaust port, and a two-position reciprocable main valve member associated with said ports for establishing communication only between the inlet and outlet ports in open position, and communication only between the outlet and exhaust port in closed position, and means for actuating said main valve member between its open and closed positions, the improvements, in combination;

a. said means for actuating said valve member comprising a cylinder and piston actuator slidable therein, the cylinder having an end wall and forming an expansible chamber at one side of the piston, the piston actuator being of the same cross sectional area as the cylinder.

b. means forming a metered leakage path through the piston and between the inlet port and expansible chamber for delivering fluid to the latter at all times, c. a bleed port communicating said expansible chamber with atmosphere and having a greater flow rate than the leakage path, whereby no substantial pressure increase in the expansible chamber occurs when the bleed port is open, d. a bleed valve for closing said bleed port, e. means for moving said bleed valve to closed position, comprising a movable wall having a cross sectional area considerably in excess of the cross sectional area of the bleed port forming an end of a closed chamber whereby a relatively low control pressure applied to the closed chamber may maintain the bleed port closed against the increasing and relatively high pressure in the expansible chamber, f. means for communicating said closed chamber with a source of relatively low control pressure, g. a spring urging the main valve member toward closed position, h. said housing being provided with a first circular bore at one end, a cylindrical member having an axially disposed second circular bore therein forming the cylinder for said piston actuator, a cap threadedly engaging said first bore and abutting the cylindrical member for sealingly retaining same in the first bore, said cap having an axially disposed third circular bore containing said movable wall, said cap forming at least a portion of said end of a closed chamber, and an aperture in the cap adapted to be connected to said source of low pressure, and i. the construction and arrangement being such that (1) when said bleed valve is open and said main valve member is closed, fluid constantly leaks through the bleed port to atmosphere, maintaining said expansible chamber unpressurized, and (2) when said bleed valve is closed, pressure increases in said expansible chamber and said main valve member moves in response thereto to its open position.

2. Apparatus in accordance with claim 1 wherein said movable wall is in the form of a circular flexible diaphragm provided with a peripherally extending and laterally projecting flange engageable in said third bore and adapted to sealingly engage same under pressure applied to said flange.

3. Apparatus in accordance with claim 1 wherein said piston actuator includes a fourth circular bore opening into the face thereof adjacent the expansible chamber, a filter seated in said fourth bore, and a plug disposed adjacent the filter and containing said metered leakage path.

4. Apparatus in accordance with claim 1 including an annular recess surrounding said piston actuator, and a Chevron type packing member mounted in said recess with the open end toward said end wall to apply minimum friction as the piston moves toward said end wall.

5. Apparatus in accordance with claim 1 wherein said main valve member comprises a valve stem affixed at one end to the piston actuator, and a pair of axially spaced annular disc shaped valve seat seals secured to and surrounding said valve stem.

6. Apparatus in accordance with claim 5 wherein said one end of the valve stem threadedly engages the piston actuator, and a spacer sleeve surrounding the valve stem having ends abutting the valve seat seals.

* * * * *